United States Patent [19]
Kline et al.

[11] Patent Number: 5,802,341
[45] Date of Patent: Sep. 1, 1998

[54] METHOD FOR THE DYNAMIC ALLOCATION OF PAGE SIZES IN VIRTUAL MEMORY

[75] Inventors: J. Bradley Kline, Little Canada; David Wagner, Apple Valley, both of Minn.; Ahmed K. Ezzat, Cupertino, Calif.

[73] Assignee: Cray Research, Inc., Eagan, Minn.

[21] Appl. No.: 166,451

[22] Filed: Dec. 13, 1993

(Under 37 CFR 1.47)

[51] Int. Cl.$^6$ ............................................. G06F 12/10
[52] U.S. Cl. ..................... 395/419; 395/497.02; 395/417
[58] Field of Search ................ 395/497.01, 497.02, 395/497.03, 497.04, 419, 417

[56] References Cited

U.S. PATENT DOCUMENTS

| | | | |
|---|---|---|---|
| 4,035,778 | 7/1977 | Ghanem | 395/650 |
| 4,903,234 | 2/1990 | Sakoraba et al. | 365/49 |
| 5,193,167 | 3/1993 | Sites et al. | 395/490 |
| 5,367,705 | 11/1994 | Sites et al. | 395/800 |
| 5,375,214 | 12/1994 | Mirza et al. | 395/417 |
| 5,426,752 | 6/1995 | Takahashi et al. | 395/419 |
| 5,454,091 | 9/1995 | Sites et al. | 395/413 |

FOREIGN PATENT DOCUMENTS

| | | |
|---|---|---|
| 4344549 | 1/1992 | Japan . |
| A04344549 | 4/1993 | Japan . |

OTHER PUBLICATIONS

IBM Technical Disclosure Bulletin, vol. 27, No. 4B, Sep. 1984, New York, pp. 2296–2298, T.A. Kriz, "Variable Block Paging For Virtual Memory."
Computer Architecture News, vol. 20, No. 2, May 1992, pp. 415–424, XP 000277787, Madhusudhan Talluri et al, "Tradeoffs in Supporting Two Page Sizes."
Communications of the Association for Computing Machinery, vol. 36, No. 2, Feb. 1993, New York, pp. 45–53, XP000358265, Kronenberg et al., "Porting Open VMS from VAX to Alpha AXP."
David A. patterson and John L. Hennessy, Ch. 7.3 pp. 481–501, *Computer Organization & Design: The Hardware/Software Interface*, 1994, Morgan Kaufmann Publishers, Inc.
Harold S. Stone, Ch. 2.3.2, 2.3.3 pp. 75–84, *High-Performance Computer Architecture*, 1987, Addison-Wesley Publishing Company.

*Primary Examiner*—Jack A. Lane
*Attorney, Agent, or Firm*—Schwegman, Lundberg, Woessner & Kluth, P.A.

[57] ABSTRACT

A system and method for virtual memory management. A plurality of virtual memory pages having selectable page sizes are used to tailor memory allocations in a way which balances overallocation of memory against the number of entries saved in accessing that memory through the translation buffer. A library routine can act on the overallocated memory to hide memory requests from the operating system.

15 Claims, 7 Drawing Sheets

METHOD FOR THE DYNAMIC ALLOCATION OF PAGE SIZES IN VIRTUAL MEMORY

BACKGROUND OF THE INVENTION

1. Field of the Invention

The present invention pertains generally to the field of high speed digital processing systems, and more particularly to a method of determining an appropriate page size in a multiple page size virtual memory.

2. Background Information

Virtual memory operating systems are well known in the art for their ability to optimize the use of memory in a hierarchical memory system. In a hierarchical memory system, a range of memory devices are available to the processor. Typically, these devices range from relatively fast but reduced capacity devices such as SRAM or DRAM to very slow but high density memory devices such as disk drives.

By taking advantage of the principle of locality, virtual memory managers can produce system memory access speeds that approach the access speed of the fastest memory components in the system. Such managers try to keep the most active elements in the memory that has the highest speed. As elements become less active, the memory manager shifts them back to slower memory.

Virtual memory is typically divided into a number of uniform size pages. Active virtual memory pages are placed within available physical memory via a free page list or other replacement algorithm. It is critical, therefore, to map virtual memory addresses into physical memory addresses in the fastest, most efficient manner. In some systems, a page map residing in system memory is used to show the mapping of active virtual memory pages to physical memory. In others, the most active virtual memory page locations are kept resident in a cache-like translation buffer placed in or near the processing element. One such translation buffer implementation is shown in FIG. 1. In the memory addressing system of FIG. 1, a processing element issues a virtual memory address 10 made up of a virtual memory page address 12 and a virtual memory page offset 14.

Translation buffer 20 contains one or more physical page addresses 24. Each physical page address 24 is associated with a virtual memory page address 12 through a virtual memory page tag 22. In addition, each translation buffer entry includes a valid bit 26 which indicates if a particular physical page address 24 is still valid. In operation, virtual memory page address 12 is compared to the virtual memory page tags 22 resident in translation buffer 20. If a match is found, a physical page address 24 corresponding to that virtual memory page address 12 is present in translation buffer 20; that physical memory address becomes physical page number 42 of physical address 40. Virtual memory page offset 14 becomes physical page offset 44 of physical page address 40.

If there is no match (a translation buffer "miss"), page table 30 must be examined for the proper physical address page. Since page table 30 has a physical page address 32 for each possible virtual memory page address 12, no tag field is necessary. A valid bit 34 is provided for each virtual memory page address 12, however, to indicate invalid pages.

In some systems, a translation buffer miss is handled as an exception condition. In such a "dynamic replacement" approach, a processing element associated with translation buffer 20 will, in response to the miss exception condition, access a page table 30 stored in system memory. Once the virtual to physical page mapping is known, the physical page address 24 and its associated virtual memory tag 22 is entered into translation buffer 20. Virtual page offset 14 is then concatenated to the physical page address 32 read from page table 30 to form physical address 40. In dynamic replacement systems the system returns from the exception after the physical page address 24 and its associated virtual memory tag 22 are stored to a line in translation buffer 20. The memory access is then repeated, the memory access results in a translation buffer hit and the system proceeds as normal.

Typically, free pages of physical memory are kept in a free page table and are assigned to virtual memory pages on a first-come, first-served basis. In a situation where a block of data or instructions extends to more than one physical memory page, that block may be distributed in a number of noncontiguous physical memory pages. As memory allocation requests are made to increase the size of a dynamic block of memory, more pages are allocated from the heap via a free page table. Likewise, as memory is returned to the heap, the corresponding page addresses are added to the free page table. Since, as detailed above, each physical memory page is assigned a separate entry in translation buffer 20, the result is that a significant number of entries in translation buffer 20 could be associated with the same block of data. In cases where the number of entries in translation buffer 20 are limited, this approach can lead to excessive churning within translation buffer 20.

There is a need for a virtual memory management system that provides the advantageous translation buffer benefits above while avoiding the inefficiencies associated with assigning multiple buffer entries to a single block of data.

SUMMARY OF THE INVENTION

The present invention provides a system and method for virtual memory management which optimizes virtual memory to physical memory address translation in situations where the number of translation buffer entries is limited. According to the invention, physical memory pages can be one of a number of different page sizes, with a page granularity field indicating the size of a particular page. In operation, a page size is selected which balances excess memory allocated against the number of entries saved in accessing that memory through the translation buffer.

According to another aspect of the current invention, a memory manager operates to assign memory in response to a memory allocation request so as to balance the number of translation buffer entries against the size of memory allocated. Physical pages are assigned to memory blocks in such a way as to maintain contiguous memory pages in physical memory.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1:
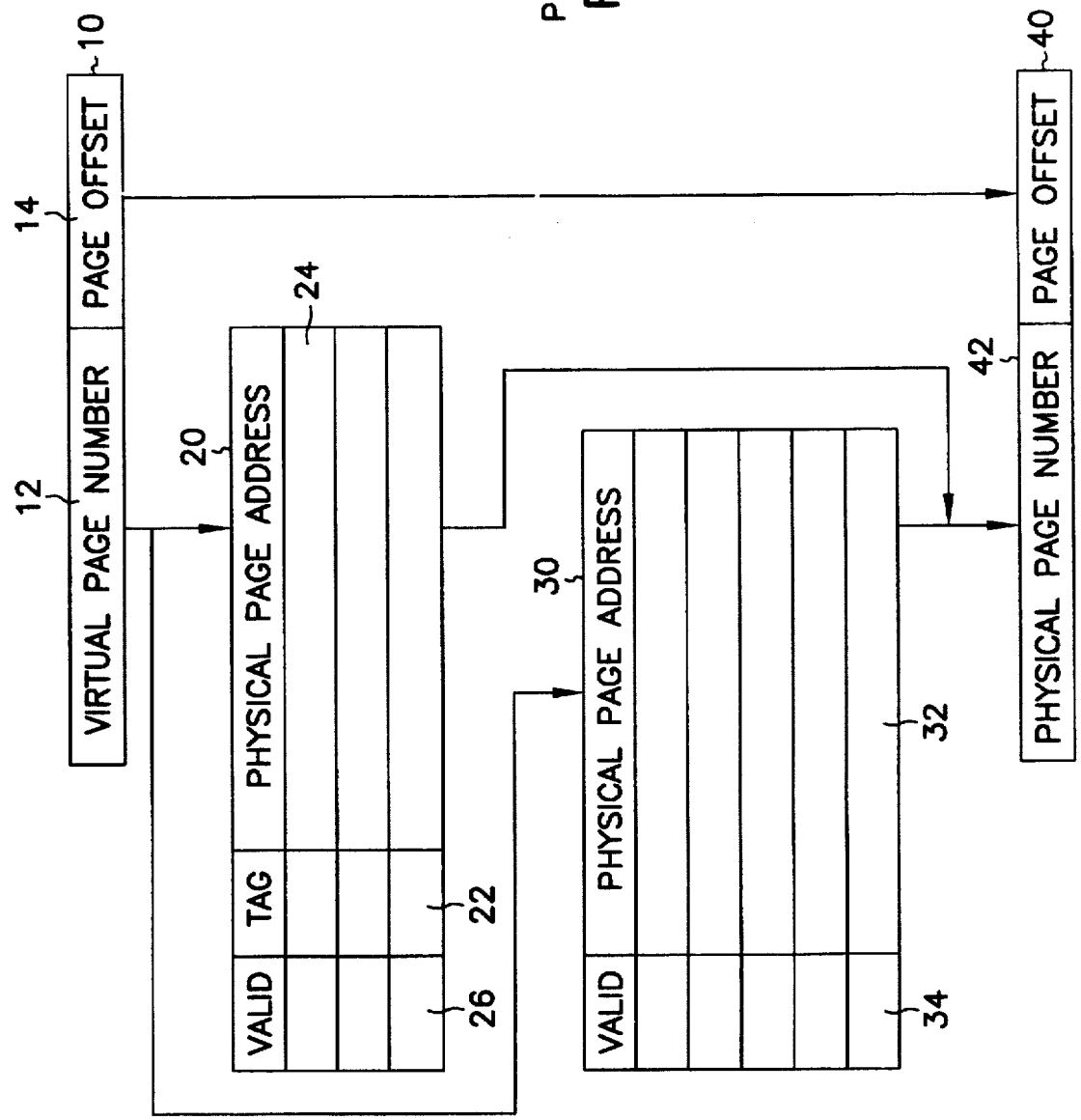
FIG. 1 is a drawing illustrative of a prior art virtual memory mapping mechanism.
Figure 2:
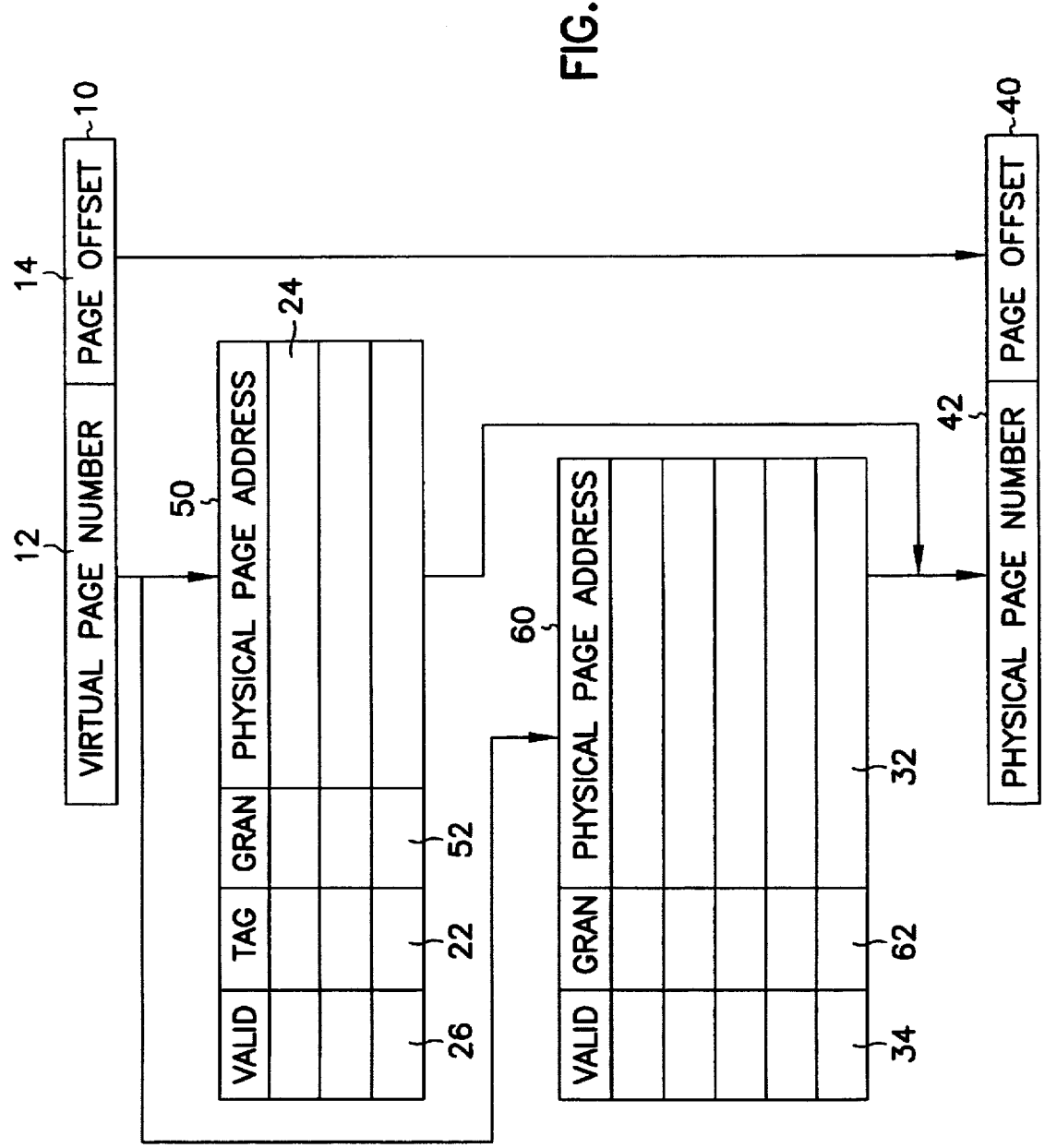
FIG. 2 is a drawing illustrative of a virtual memory mapping mechanism according to the present invention.

A virtual memory addressing architecture which optimizes virtual memory to physical memory address translation in situations where the number of translation buffer entries is limited is illustrated generally in FIG. 2. The memory addressing system of FIG. 2 is similar to that in FIG. 1 but with the addition of page granularity fields 52 and 62 for indicating the size of a particular page. In FIG. 2 translation buffer 50 contains one or more physical page addresses 24. Each physical page address 24 is associated with a virtual memory page address 12 through a virtual memory page tag 22. In addition, each translation buffer entry includes a valid bit 26 which indicates if a particular physical page address 24 is still valid and a page granularity field 52 which indicates the size of the physical memory page. In one embodiment, two bits of granularity hint are used to indicate four different page sizes.

Figure 6:
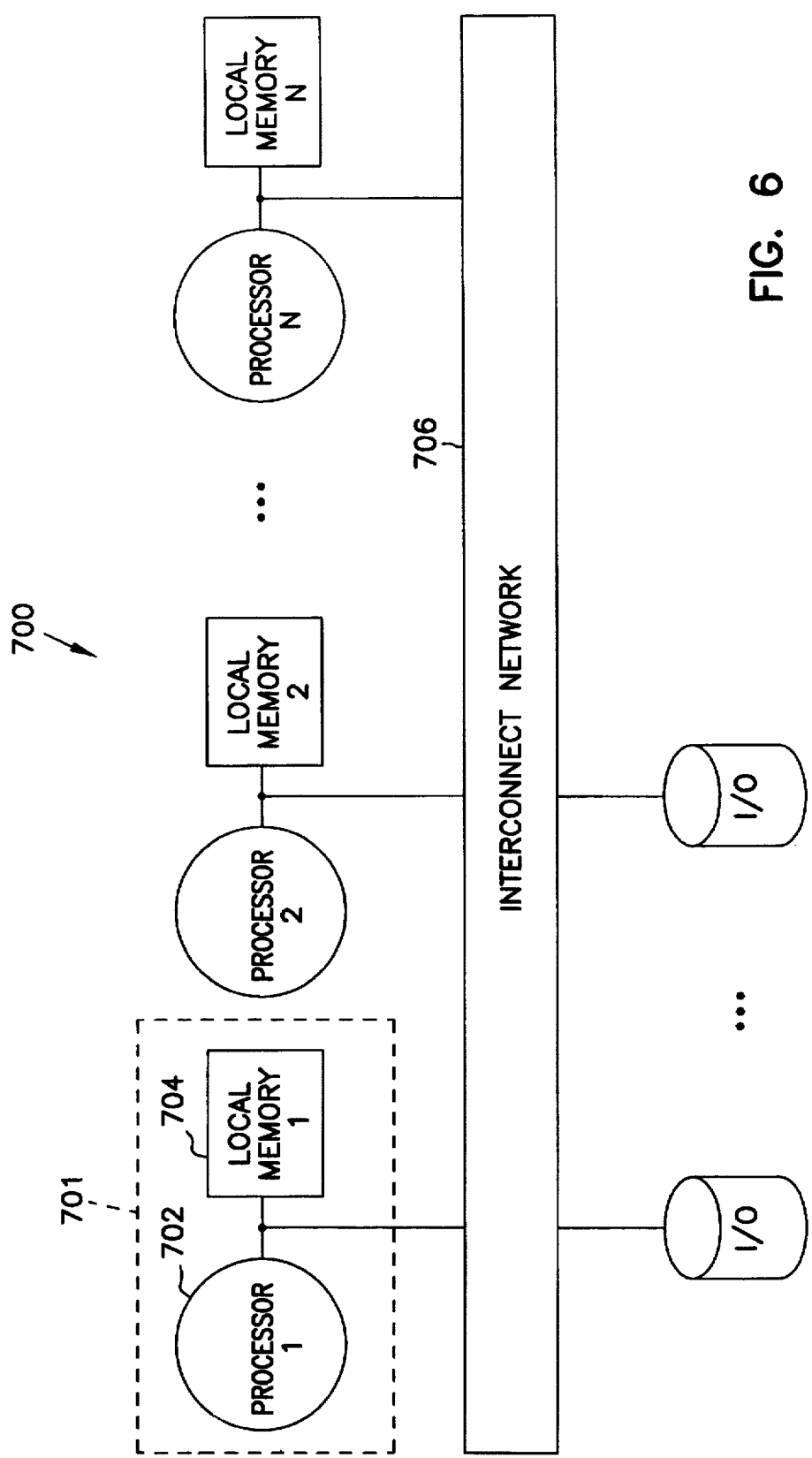
FIG. 6 is a top level block diagram of a massively parallel processing system.

In the preferred embodiment, a translation buffer 50 such as that described above is implemented with a Digital Equipment Corporation ALPHA microprocessor such as that described in Alpha Architecture Handbook, published 1992 by Digital Equipment Corporation. The ALPHA microprocessor has on-chip data and instruction translation buffers which can be used to translate virtual memory addresses to physical addresses for data and instruction memory accesses, respectively. The ALPHA chip permits dynamic replacement of translation buffer entries through exception handling but, due to the fact that there are only thirty-two entries available in the translation buffer, there is a severe performance penalty unless the system is managed to minimize the frequency of translation buffer misses. In the preferred embodiment, the ALPHA microprocessor is used as processor 702 of massively parallel processing (MPP) system 700 shown in FIG. 6.

The ALPHA chip implements a translation buffer 50 such as that shown in FIG. 2. In the ALPHA chip, a single entry in the internal data translation buffer contains a two-bit page granularity field 52, which can be used to describe pages of 8 KB, 64 KB, 512 KB, or 4 MB worth of contiguous physical memory. Page granularity field 52 can be used to implement a virtual memory in which four different page sizes are used to minimize entries in the data translation buffer. In effect, granularity field 52 determines the number of bits of the virtual address tag that will be compared to the virtual address.

A virtual memory with more than one page size can be used advantageously to balance the number of translation buffer entries against overallocation of memory. If a memory request is for more than a certain number of pages of a particular page size, it may be advantageous to assign the next larger page size and, in effect, overallocate the memory. In certain situations, the performance gained by eliminating thrashing within the translation buffer more than compensates for the inefficient allocation of memory.

When a block of memory is going to stay the same size throughout execution of the user program and that size is known at compile time, that block is usually assigned a fixed amount of space within a static data area allocated in memory. When, however, the amount of space needed for a particular data structure is expected to change during execution, that block is assigned space within a dynamic data area. The dynamic data area is expected to increase and decrease in size as memory allocation requests are made during program execution.

The intelligent choice of page sizes increases the likelihood that a particular memory access will result in a translation buffer hit. In situations where a block of memory can be described as a large number of pages, each having a potential entry in the translation buffer, it may be useful to allocate a slightly larger amount of memory in order to consolidate the block of memory within one page having a single translation buffer entry. For instance, a segment of 4088 KB would require a minimum of 21 translation buffer entries (7*512 KB+7*64 KB+7*8 KB). It may be a more efficient use of the translation buffer to grow the 4088 KB memory block by a single 8 KB page in order to consolidate that memory block within a single 4096 KB page which can be described as a single 4 MB entry in the translation buffer.

Figure 3:
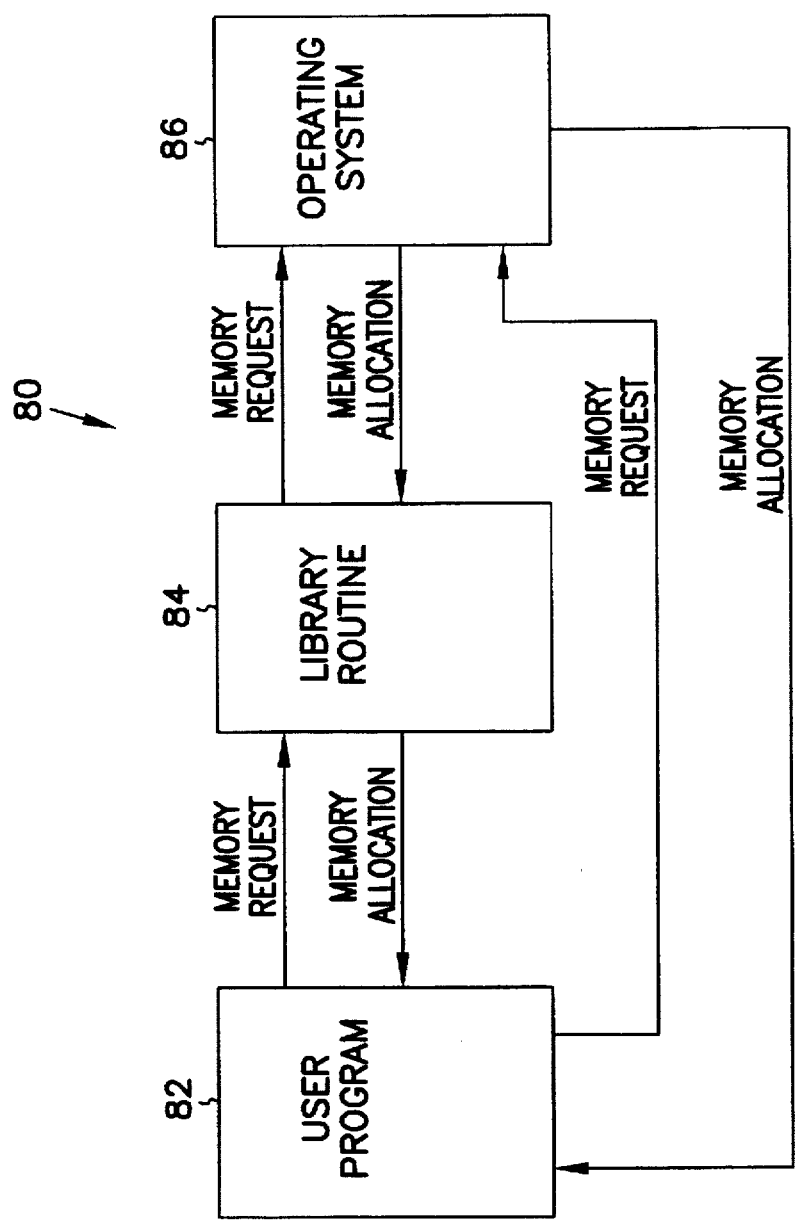
FIG. 3 is an illustration of a system having different levels of memory allocation requests.

Execution of a memory allocation request is described next. A diagram which illustrates a hierarchical approach to memory allocation is shown generally in FIG. 3. In the system of FIG. 3, a memory allocation request (such as a C language malloc) originates in a user program 82, is passed to a library routine 84 and is executed in operating system 86. In certain systems, the library routine can be bypassed and the request can be passed directly from user program 82 to operating system 86.

Library routine 84 is used to make operating system 86 more independent of the user's declaration of data objects. As can be seen in "METHOD OF MANAGING DISTRIBUTED MEMORY WITHIN A MASSIVELY PARALLEL PROCESSING SYSTEM," filed herewith by Wagner et al. and assigned U.S. patent application Ser. No. 08/166,293 now U.S. Pat. No. 5,566,321 issued date Oct. 15, 1996, in the preferred embodiment memory is segmented, with a virtual segment address being mapped into a physical segment in a local memory. For instance, the operating system will set up a shared heap, a shared stack, a private heap and a private stack. Shared memory is available to other processors in the system while private memory is primarily for use by the local processing element's processor.

In such a system, library routine 84 receives a request declaring an array A within the main routine of a program manipulating private memory. If operating system 82 has previously allocated enough memory in the private heap, that memory request will not get through library routine 84. Instead, library routine 84 will acknowledge the request as if the memory was just allocated.

On the other hand, if a request to declare an array A is received by library routine 84 and there is not enough memory allocated in the heap to accommodate the request, the private heap segment must grow to the extent necessary to meet the request.

Figure 4:
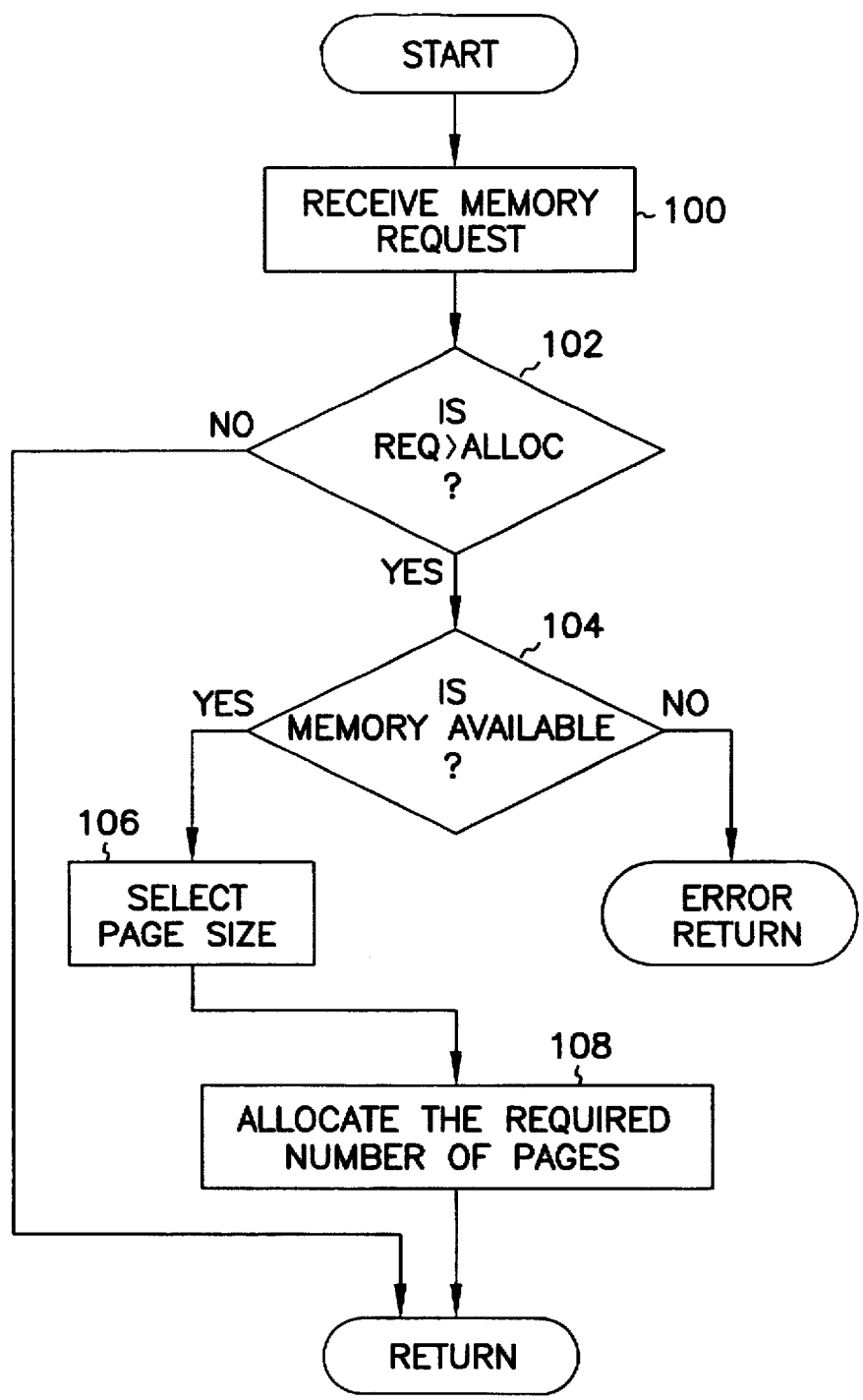
FIG. 4 is a flowchart illustrative of the steps an operating system goes through in allocating memory in response to a memory request.

A software flowchart illustrative of the software and the corresponding method steps an operating system executes in allocating memory in response to a memory request is illustrated generally in FIG. 4. The software resides in local memory 704 of FIG. 6 and is executed in the associated processor 702 in the processing element 701. In the operating system of FIG. 4, at 100 the operating system receives a memory allocation request from a library routine or user program as described above. At 102 the operating system program compares the space requested by the memory request against the amount already allocated for that particular memory segment. If the requested space is greater than that allocated, the program moves to 104 where it determines if there is enough remaining free memory. If not, the program returns an error message to the calling program. If there is available free memory, the program moves to 106 where the optimal page size is selected and to 108 where the proper number of pages at the selected page size are allocated. The program then returns to the requesting library or user routine. In the case of the malloc instruction, the operating system returns the address of the initial byte assigned to that block of memory.

If, at 102, the requested space is less than or equal to the amount of memory already allocated, the program simply returns to the requesting library or user routine. As above, in the case of the malloc instruction, the operating system returns the address of the initial byte assigned to that block of memory.

In the flowchart of FIG. 4 the operating system must, at 106, select the appropriate page size. Such a selection can be determined by observation of execution of the user program issuing the memory request or it can be determined dynamically as a function of the frequency of translation buffer misses versus available free memory. It should be obvious that when an 8 KB segment needs to grow slightly (e.g. to 16 KB) there is little choice but to use two 8 KB entries in the data translation buffer to describe the required translations. If, however, a 48 KB block of memory is to grow to 56 KB, an operating system can have a significant effect on translation buffer usage by describing that segment using a single 64 KB translation buffer entry rather than the typical seven 8 KB translation buffer entries. In effect, the overallocation of 8 KB of memory is offset by the potential for decreased thrashing in the translation buffer.

In one embodiment, the operating system assigns the next larger page size when the memory request is for M/N or more of the larger page size (where M=the number of smaller pages needed to fill the memory request and where N is the factor by which one page size is bigger than the next smaller page size). In general, it has been found to be advantageous to set M at approximately ¾ of N. In an embodiment based on the ALPHA chip described above, available page sizes are 8 KB, 64 KB, 512 KB and 4 MB bytes and, therefore, N=8 for each transition between page sizes.

In such an embodiment, M equals ¾ of N or 6.

In one embodiment, the number of pages required at the smaller page size before the larger page size is allocated is programmable and can be adjusted dynamically as conditions change within the program being executed. For instance, in one embodiment, if a program is generating a great deal of translation buffer misses, M can be set to a number less than ¾ of N. On the other hand, if memory is tight, the number of pages needed to assign a larger page size may go to N−1. It should be obvious that the proper value of M is a function of the process being executed;

setting M/N to approximately ¾ as described in the ALPHA example above is simply one approach which has produced good results.

In one embodiment, in configurations having a single virtual memory space (no more than one user per processor), pages assigned to the same memory block are placed contiguously in physical memory. For instance, 8 KB pages assigned to the same memory block are placed contiguously so that when it is time to upgrade the memory block to a single 64 KB page minimal shifting of memory is required.

Figure 7:
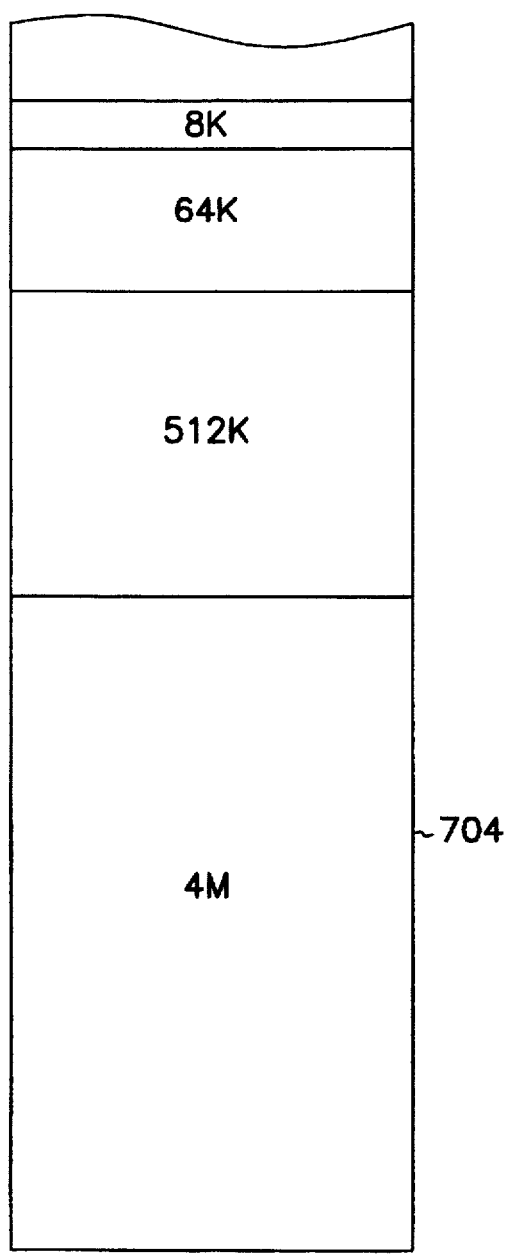
FIG. 7 is a tabular representation of the stacking of pages of different granularities according to the present invention.

Memory management in such an embodiment no longer relies a free list of just random uniform size pages. Since all pages for a certain memory block are being consolidated in a contiguous segment of physical memory, that memory block grows within a specific area of physical memory. In such an embodiment, the most important inquiry is the proper threshold condition for moving from one page size to the next. In the preferred embodiment, as is illustrated by FIG. 7's tabular representation of a segment within local memory 704, the largest page sizes are stacked beginning at the base address of the segment, followed by the next largest, down to the smallest. Where possible, an attempt is made to place each page of a certain page size on a segment boundary equivalent to the page size. That is, a 4 MB page size is placed on a 4 MB boundary within the segment.

The above approach to allocating different size pages within the virtual memory management system provides as an added benefit a mechanism for hiding some memory allocation requests from the operating system. In a typical memory management system, when a user program 82 passes a memory allocation request (such as a malloc) through a library team 84 to an operating system 86, that request, if met, results in allocation of the amount of memory requested. In the present system, such a request may result in the overallocation of memory due to the assignment of a larger page size. If the library routine is aware of that overallocation, it can just act on the next memory request to increase or decrease the amount of memory allocated without forwarding the request to the operating system.

Figure 5:
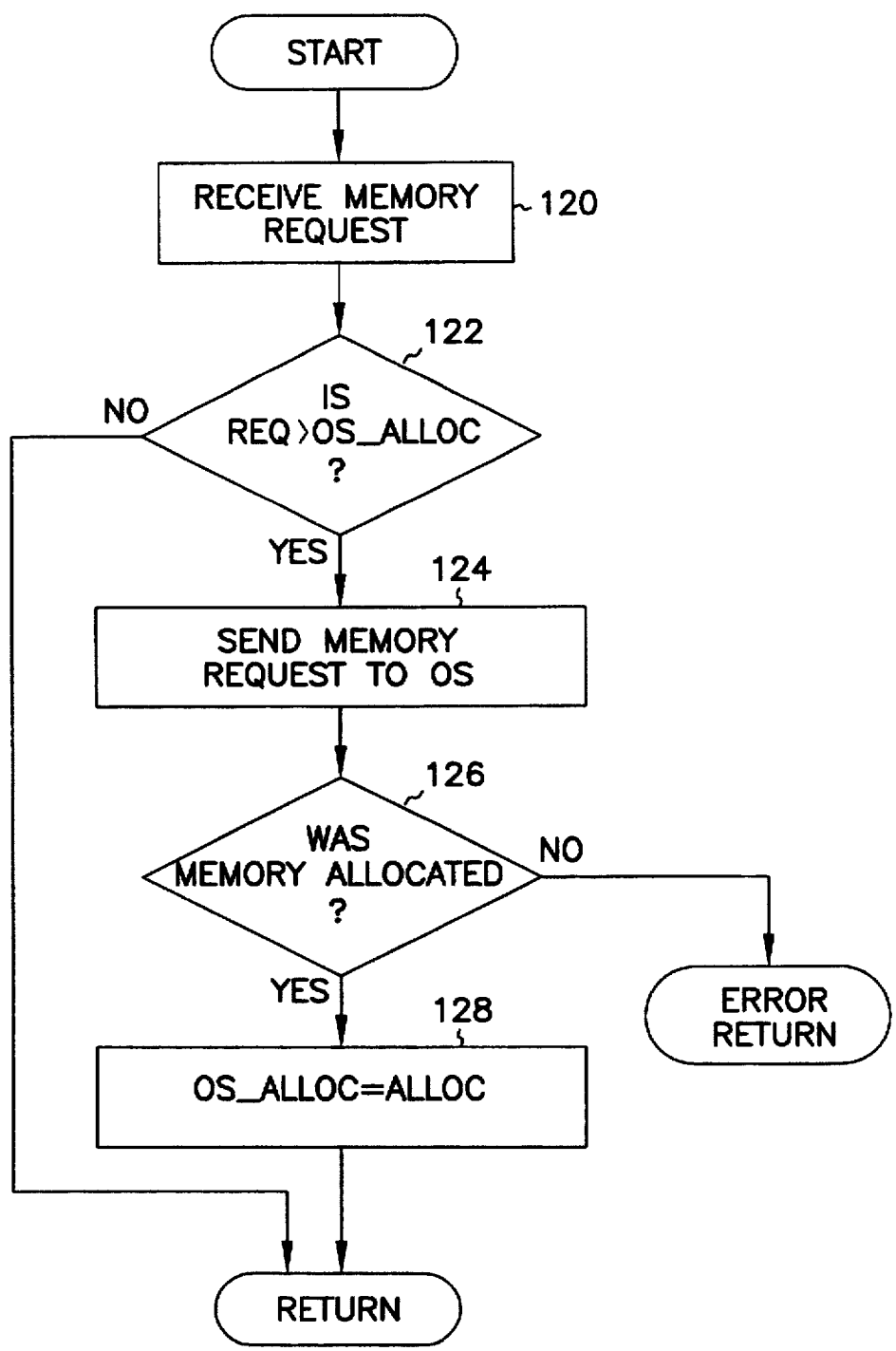
FIG. 5 is a flowchart illustrative of the steps a library routine goes through in hiding memory requests from an operating system.

One such method of hiding memory allocation requests is illustrated in the software flowchart of FIG. 5. The flowchart of FIG. 5 shows the software steps a library routine goes through in hiding memory requests from an operating system. Again the software resides in local memory 704 of processing element 701 and is executed in processor 702.

At 120 the library routine receives a memory request from a user program. At 122, the library routine checks to see if the amount of memory requested is covered by the amount allocated in the last memory request for that block of memory. In so, the library routine simply returns the appropriate signal to the user program. (In the case of a malloc issued by the user program, the routine returns the address of the first byte of data.)

If the amount allocated in the last memory request for that block of memory is less than that requested, or if this is the first request, the library routine moves to 124 where a memory request is sent to the operating system. The routine then moves to 126 where a check is made to determine if the requested memory was allocated by the operating system and a segment size returned. If not, the routine returns an error message to the user program. If, however, a segment size was returned at 126, that segment size is saved 128 in order to be used to indicate the amount of memory actually allocated. That amount is stored and used to respond at 122 to the next request to increase the same block of memory. The routine returns the appropriate signal to the user program.

The memory request hiding embodiment will be described in the example of an array called TEMP allocated within the private heap. Initially, in this example and assuming no previous segment size (not realistic but makes the example easier), the request is for 56 KB. During execution, a user program will issue a memory request for a dynamic array called TEMP. That request will be processed by a library routine, which will issue an operating system call to increase the dynamic data area. The operating system will allocate 64 KB and return that size as the size of the heap. Finally, the library routine returns the address of the first byte of TEMP to the calling user program.

If at some later time the user program wishes to increase the size of TEMP to 58 KB, it issues another memory request. As above, the request is processed by the library routine. If, as in this case, the amount of memory requested is less than that allocated for the last request, the library routine skips the operating system call and simply returns the address of the first byte of TEMP to the calling user program. If, however, the request was for 68 KB, the library routine will issue an operating system call to increase the dynamic data area and proceed as above.

It can be seen that the ability to skip operating system calls for increased memory allocations is a byproduct of the overallocation of memory. That overallocation of memory conserves translation buffer entries by minimizing translation buffer thrashing at the cost of allocating potentially unusable memory. Although the present invention has been described with reference to the preferred embodiments, those skilled in the art will recognize that changes may be made in form and detail without departing from the spirit and scope of the invention.

What is claimed is:

1. In a virtual memory system having a plurality of page sizes, including a first and a second page size, wherein the first page size is smaller than the second page size, a method of allocating memory comprising the steps of:
   establishing a first threshold memory size, wherein the first threshold memory size is greater than the first page size but less than the second page size;
   receiving a memory allocation request for a first block of memory, wherein the memory allocation request includes a requested memory size;
   comparing the requested memory size to the first threshold memory size;
   if the requested memory size is less than the first threshold memory size, allocating at least one first page size page; and
   if the requested memory size is greater than the first threshold memory size, allocating at least one larger page size page.

2. The method of allocating according to claim 1 wherein the second page size is N times larger than the first page size and wherein the first threshold memory size is equal to M/N, where N and M are positive integers greater than one and wherein M is less than N.

3. The method of allocating according to claim 2 wherein M is greater than or equal to N/2.

4. The method of allocating according to claim 2 wherein M varies as a function of available free memory.

5. The method of allocating according to claim 2 wherein M varies as a function of available entries in a translation buffer.

6. The method of allocating according to claim 1 wherein, in a system in which the plurality of page sizes further includes a third page size which is larger than the first and the second page sizes, the method further comprises the steps of:
   establishing a second threshold memory size, wherein the second threshold memory size is greater than the second page size but less than the third page size; and
   wherein the step of allocating at least one larger page size page includes the steps of:
   comparing the requested memory size to the second threshold memory size;
   if the requested memory size is less than the second threshold memory size, allocating at least one second page size page; and
   if the requested memory size is greater than the second threshold memory size, allocating at least one third page size page.

7. The method of allocating according to claim 6 wherein the first threshold memory size is a fraction of the second page size and wherein the second threshold memory is a fraction of the third page size, wherein the fractions are equal.

8. In a virtual memory system having a plurality of memory page sizes, including a first and a second page size, wherein the first page size is smaller than the second page size, a method of allocating memory comprising the steps of:
   establishing a threshold memory size, wherein the threshold memory size is greater than the first page size but less than the second page size;
   receiving a memory allocation request for a first block of memory, wherein the memory allocation request includes a requested memory size;
   determining if memory pages have been previously allocated for the first block of memory;
   if memory pages have been previously allocated for the first block of memory, determining page sizes of the memory pages previously allocated and summing the page sizes of the memory pages previously allocated for the first block of memory to determine an allocated memory size associated with the first block of memory; and
   if the allocated memory size is less than the requested memory size, allocating additional memory, wherein the step of allocating memory comprises the steps of:
   comparing the requested memory size to the threshold memory size;
   if the requested memory size is less than the threshold memory size, allocating at least one first page size page; and
   if the requested memory size is greater than the threshold memory size, allocating at least one second page size page.

9. A method of executing memory allocation requests from a user program in a virtual memory system having multiple page sizes, including a first and a second page size, wherein the first page size is smaller than the second page size, the method comprising the steps of:
   generating a memory allocation request for a particular block of memory;
   comparing the memory allocation request to an amount of memory allocated previously for the particular block of memory, wherein the previously allocated memory comprises a plurality of different page size pages;
   if the memory allocation request is for an amount of memory larger than the amount previously allocated, issuing an operating system call to allocate additional memory, wherein the step of issuing includes the steps of:
   dividing the memory allocation request by the second page size to obtain a quotient and a remainder;
   allocating a number of second page size pages equivalent to the quotient;
   comparing the remainder to a threshold memory size, wherein the threshold memory size is greater than the first page size but less than the second page size; and if the remainder is less than the threshold memory size, allocating at least one first page size page; and if the memory allocation request is for an amount of memory less than or equal to the amount previously allocated, returning without issuing the operating system call.

10. A virtual memory system having a plurality of page sizes, including a first and a second page size, the system comprising;

a processor;

a translation buffer, wherein the translation buffer comprises a contents addressable memory having a plurality of virtual page entry slots, wherein each virtual page entry slot contains a physical page address, a virtual address tag, an indication of whether the entry is valid and a page size field used to indicate the page size associated with the virtual page entry slot; and memory allocation means for allocating one or more pages of memory in response to a request for a memory allocation, wherein the memory allocation means comprises page size determining means for establishing a threshold memory size and for determining an optimal page size based on the memory allocation requested, the threshold memory size and the virtual page entries needed to cover the requested memory allocation, wherein the threshold memory size is greater than the first page size but less than the second page size.

11. The virtual memory system according to claim 10, wherein the page size determining means comprise means for balancing an overallocation of memory against the number of virtual page entries slots needed for a particular memory allocation, wherein the balancing means comprise means for balancing the number of virtual page entries against available free memory.

12. The virtual memory system according to claim 10, wherein the page size determining means comprise means for determining available virtual page entry slots and means for allocating memory based on available virtual page entry slots.

13. The virtual memory system according to claim 12, wherein the page size determining means further comprise means for balancing available free memory against the number of virtual page entries needed for a particular memory allocation.

14. A virtual memory system having a plurality of page sizes, including a first and a second page size, and a translation mechanism having a plurality of virtual page entries, the system comprising:

library call processing means for processing a memory allocation request from a user, wherein the memory allocation request includes a requested memory size and a block identifier;

operating system call processing means, connected to the library call processing means, for allocating memory based on the memory allocation request, wherein the operating system call processing means comprise means for selecting a page size from a plurality of available page sizes based on the requested memory size, wherein the means for selecting comprises page determining means for establishing a threshold memory size and for determining an optimal page size based on the memory allocation requested, the threshold memory size and the virtual page entries needed to cover the requested memory allocation, wherein the threshold memory size is greater than the first page size but less than the second page size; and translation means for converting a virtual address to a physical address, wherein the translation means comprise means for associating the selected page size with a virtual address.

15. The virtual memory system according to claim 14 wherein the library call processing means comprise means for determining if the memory allocation request is requesting an amount of memory which is less than that previously allocated, and, if so, for hiding the memory request from the operating system call processing means.

* * * * *